US011514310B2

(12) United States Patent
Mao et al.

(10) Patent No.: US 11,514,310 B2
(45) Date of Patent: Nov. 29, 2022

(54) TRAINING A CLASSIFIER TO DETECT OPEN VEHICLE DOORS

(71) Applicant: Waymo LLC, Mountain View, CA (US)

(72) Inventors: Junhua Mao, Palo Alto, CA (US); Lo Po Tsui, Mountain View, CA (US); Congcong Li, Cupertino, CA (US); Edward Stephen Walker, Jr., San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 887 days.

(21) Appl. No.: 16/231,297

(22) Filed: Dec. 21, 2018

(65) Prior Publication Data

US 2020/0202209 A1 Jun. 25, 2020

(51) Int. Cl.
*G06N 3/08* (2006.01)
*G06N 3/04* (2006.01)

(52) U.S. Cl.
CPC .............. *G06N 3/08* (2013.01); *G06N 3/04* (2013.01)

(58) Field of Classification Search
CPC ............ G06N 3/08; G06N 3/04; G06N 5/022; G06N 3/0472
See application file for complete search history.

(56) References Cited

U.S. PATENT DOCUMENTS 9,987,745 B1 6/2018 Berard et al.
2017/0262727 A1 9/2017 Kozuka et al.

2019/0250626 A1* 8/2019 Ghafarianzadeh ..... G06N 20/00
2020/0202209 A1* 6/2020 Mao ...................... G06K 9/6262
2020/0249038 A1* 8/2020 Nashed .............. B60W 60/0011

FOREIGN PATENT DOCUMENTS

JP 2012146142 8/2012
JP 2017162436 9/2017

OTHER PUBLICATIONS

Narayanan et al., "Using Data Analytics to Detect Anomalous States in Vehicles", Dec. 25, 2015, arXiv:1512.08048v1, pp. 1-10. (Year: 2015).*

(Continued)

*Primary Examiner* — Ying Yu Chen
(74) *Attorney, Agent, or Firm* — Fish & Richardson P.C.

(57) ABSTRACT

Methods, systems, and apparatus, including computer programs encoded on computer storage media, for training a classifier to detect open vehicle doors. One of the methods includes obtaining a plurality of initial training examples, each initial training example comprising (i) a sensor sample from a collection of sensor samples and (ii) data classifying the sensor sample as characterizing a vehicle that has an open door; generating a plurality of additional training examples, comprising, for each initial training example: identifying, from the collection of sensor samples, one or more additional sensor samples that were captured less than a threshold amount of time before the sensor sample in the initial training example was captured; and training the machine learning classifier on first training data that includes the initial training examples and the additional training examples to generate updated weights for the machine learning classifier.

20 Claims, 3 Drawing Sheets

(56) References Cited

OTHER PUBLICATIONS

Nirmali et al., "Vehicular Data Acquisition and Analytics System for Real-Time Driver Behavior Monitoring and Anomaly Detection", 2017, ICIIS'2017, pp. 1-6. (Year: 2017).*
PCT International Preliminary Report on Patentability in International Appln. No. PCT/US2019/068331, dated July 1, 2021, 9 pages.
Abdelhady, "Vehicle Classification For Automatic Traffic Density Estimation," A Thesis Submitted to The Department of Computer Science and Engineering, The American University in Cairo, School of Science and Engineering, Oct. 2013, 109 pages.
Ali et al., "Smart Robotic Wheelchair for Bus Boarding Using CNN Combined with Hough Transforms," Lecture Notes in Computer Science, Jul. 2018, 10956:163-172.
Barandela et al., "Restricted Decontamination for the Imbalanced Training Sample Problem," Lecture Notes in Computer Science, Nov. 2003, 2905:424-431.
PCT International Search Report and Written Opinion in International Appln. No. PCT/US2019/068331, dated Jun. 16, 2020, 14 pages.
Kato et al., "Selecting Training Images Using Underlying Common Classes," IPSJ Journal, Jan. 2014, 55(1):542-552 (with English abstract).
Office Action in Japanese Appln. No. 2021-533428, dated Aug. 24, 2022, 5 pages (with English translation).
Okatani, "Research Trend in Deep Leaning for Visual Recognition—Advances of Convolutional Neural Networks and Their Use," Journal of the Japanese Society for Artificial Intelligence, Mar. 2016, 31(2):169-179 (with English abstract).

* cited by examiner

TRAINING A CLASSIFIER TO DETECT OPEN VEHICLE DOORS

BACKGROUND

This specification relates to autonomous vehicles.

Autonomous vehicles include self-driving cars, boats, and aircraft. Autonomous vehicles use a variety of on-board sensors and computer systems to detect nearby objects and use such detections to make control and navigation decisions.

Some autonomous vehicles have on-board computer systems that implement neural networks, other types of machine learning models, or both for various prediction tasks, e.g., object classification within images. For example, a neural network can be used to determine that an image captured by an on-board camera is likely to be an image of a nearby car. Neural networks, or for brevity, networks, are machine learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

Each layer of a neural network specifies one or more transformation operations to be performed on input to the layer. Some neural network layers have operations that are referred to as neurons. Each neuron receives one or more inputs and generates an output that is received by another neural network layer. Often, each neuron receives inputs from other neurons, and each neuron provides an output to one or more other neurons.

An architecture of a neural network specifies what layers are included in the network and their properties, as well as how the neurons of each layer of the network are connected. In other words, the architecture specifies which layers provide their output as input to which other layers and how the output is provided.

The transformation operations of each layer are performed by computers having installed software modules that implement the transformation operations. Thus, a layer being described as performing operations means that the computers implementing the transformation operations of the layer perform the operations.

Each layer generates one or more outputs using the current values of a set of parameters for the layer. Training the neural network thus involves continually performing a forward pass on the input, computing gradient values, and updating the current values for the set of parameters for each layer using the computed gradient values. Once a neural network is trained, the final set of parameter values can be used to make predictions in a production system.

SUMMARY

This specification describes how a computer system can train a machine learning model, also referred to in this specification as a "machine learning classifier" or a "classifier" to generate a prediction of whether an object in the vicinity of an autonomous vehicle is in a particular state.

For example, the machine learning model can be an "open door classifier" that predicts whether another vehicle in the vicinity of the autonomous vehicle is in an open door state, i.e., has an open door as opposed to having all doors closed. That is, given an input that characterizes a vehicle, the output of the open door classifier is a probability that represents a likelihood that one or more of the doors of the vehicle are open. Once the open door classifier has been trained, the trained open door classifier can be deployed on a vehicle and can be used by the vehicle to make autonomous or semi-autonomous driving decisions.

As another example, the machine learning model can predict whether a school bus in the vicinity of an autonomous vehicle is in a flashing lights state, i.e., whether the lights of the school bus are flashing as opposed to turned off (or consistently turned on).

As another example, the machine learning model can predict whether another vehicle in the vicinity of an autonomous vehicle is in a parked state, i.e., whether the other vehicle is parked as opposed to being in motion or being temporarily stopped.

In one aspect of the disclosure, a method includes training a classifier that is configured to receive an input sensor sample that characterizes a particular type of object and is generated from sensor data captured by one or more sensors of an autonomous vehicle and to process the input sensor sample to generate a particular state score that represents a predicted likelihood that the object is in a particular state.

To train the classifier, a system obtains a plurality of initial training examples, each initial training example comprising (i) a sensor sample from a collection of sensor samples and (ii) label data classifying the sensor sample as characterizing an object that is in the particular state; generates a plurality of additional training examples, comprising, for each initial training example, identifying, from the collection of sensor samples, one or more additional sensor samples that were captured less than a threshold amount of time before the sensor sample in the initial training example was captured, and classifying each additional sensor sample as a sensor sample that characterizes an object in the particular state; and trains the machine learning classifier on first training data that includes the initial training examples and the additional training examples to generate updated weights for the machine learning classifier.

These and other implementations can each optionally include one or more of the following features.

The actions further include generating, using the machine learning classifier and in accordance with the updated weights, further training examples; and training the machine learning classifier on second training data that includes the further training examples to generate further updated weights for the machine learning classifier.

Training the machine learning classifier on second training data that includes the further training examples to generate further updated weights for the machine learning classifier can include: training the machine learning classifier on the second training data to generate further updated weights for the machine learning classifier starting from the updated weights for the machine learning classifier.

Training the machine learning classifier on second training data that includes the further training examples to generate further updated weights for the machine learning classifier can include: training the machine learning classifier on the second training data to generate further updated weights for the machine learning classifier starting from initial weights for the machine learning classifier.

Generating, using the machine learning classifier and in accordance with the updated weights, further training examples can include: processing each of a plurality of candidate sensor samples from the collection of sensor samples using the machine learning classifier and in accordance with the updated weights to generate a respective open door score for each candidate sensor sample; and classifying each candidate sensor sample having a particular score that exceeds a threshold score as a sensor sample that characterizes an object in the particular state.

Identifying, from the plurality of sensor samples, one or more additional sensor samples that were captured less than a threshold amount of time before the sensor sample in the initial training example was captured can include: identifying, as an additional sensor sample, each sensor sample in the plurality of samples that (i) characterizes the same object as the sensor sample in the initial training example and (ii) was captured less than a threshold amount of time before the sensor sample in the initial training example was captured.

Obtaining a plurality of initial training examples can include: identifying, from the collection of sensor samples, a plurality of candidate initial sensor samples that each include a significant amount of measurements outside of an outline of a body of the object characterized by the candidate initial sensor sample.

Particular embodiments of the subject matter described in this specification can be implemented so as to realize one or more of the following advantages.

Autonomous or semi-autonomous vehicles have sensors that collect data about the environment surrounding the vehicle as the vehicle drives through the environment. The data collected by these sensors over many driving hours and by many different autonomous vehicles (referred to in this specification as "log data") can be used to train machine learning models to make various predictions that may be relevant to the operation of the autonomous vehicle, e.g., predictions of whether a particular kind of object is in a particular state.

For example, a machine learning model that predicts whether the doors of vehicles that are encountered by the vehicle during navigation are open can be used to inform autonomous driving decisions, e.g., by applying the brake in case a person is entering or leaving through the open door or by predicting the future behavior of the vehicle or of operators of the vehicle (i.e., if the door of a vehicle is open, this may be a signal that the vehicle is unlikely to begin moving until after the door is closed or that the vehicle is stopped to load or unload items), or used to determine when to provide an alert to an operator of the vehicle.

The machine learning models that make these predictions can be trained on labeled training data, i.e., on sensor samples generated from sensor data that has been classified as characterizing an object and that are associated with a ground truth label that identifies whether the object characterized by the sensor data is in the particular state or not.

However, for some types of objects and for some particular states, while the collected log data will include a vast amount of sensor samples that characterize objects of the type, only a very small fraction of those objects will be in the particular state. Taking vehicles with an open door as an example, only a very small fraction, e.g., on the order of 1 percent or less, of other vehicles encountered by an autonomous vehicle driving through an environment will have an open door and the vast majority of the other vehicles encountered by the autonomous vehicle while driving will have all of their doors closed.

This makes generating high-quality training data for training a classifier to classify objects as being in the particular state difficult. Turning again to the open door example, in particular, because such a small fraction of the sensor samples in the log data have open doors, it is difficult to identify enough samples that have open doors without also including a large amount of noisy, incorrectly labeled samples in the training data. By training the open door classifier using the described techniques, the system can effectively solve this problem and train a classifier on the collected log data while having little to no accurately labeled training data at the outset of the training. That is, the described techniques effectively identify positive examples, e.g., examples of vehicles with an open door, from the vast number of (mostly negative) potential examples in the collected log data and use the identified positive examples to effectively train a machine learning model to accurately classify objects as being in the particular state.

In particular, and turning again to the open door example, using the described techniques, the system may initially effectively identify a relative small number of positive examples that characterize a vehicle with an open door that is very close to the vehicle capturing the sensor data. However, in order train a classifier to perform well at a range of distances, additional positive examples need to be identified and used in the training of the classifier. The described techniques allow these additional positive examples to be identified in an automated fashion and without requiring human labelers, thereby resulting in a highly-accurate open door classifier.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

This specification describes how a vehicle, e.g., an autonomous or semi-autonomous vehicle, can use a trained machine learning model, referred to in this specification as an "open door classifier" or "classifier" to predict whether or not other vehicles in the vicinity of the vehicle have open doors. This specification also describes how log data can be used to effectively train such an open door classifier to accurately and reliably make predictions.

Figure 1:
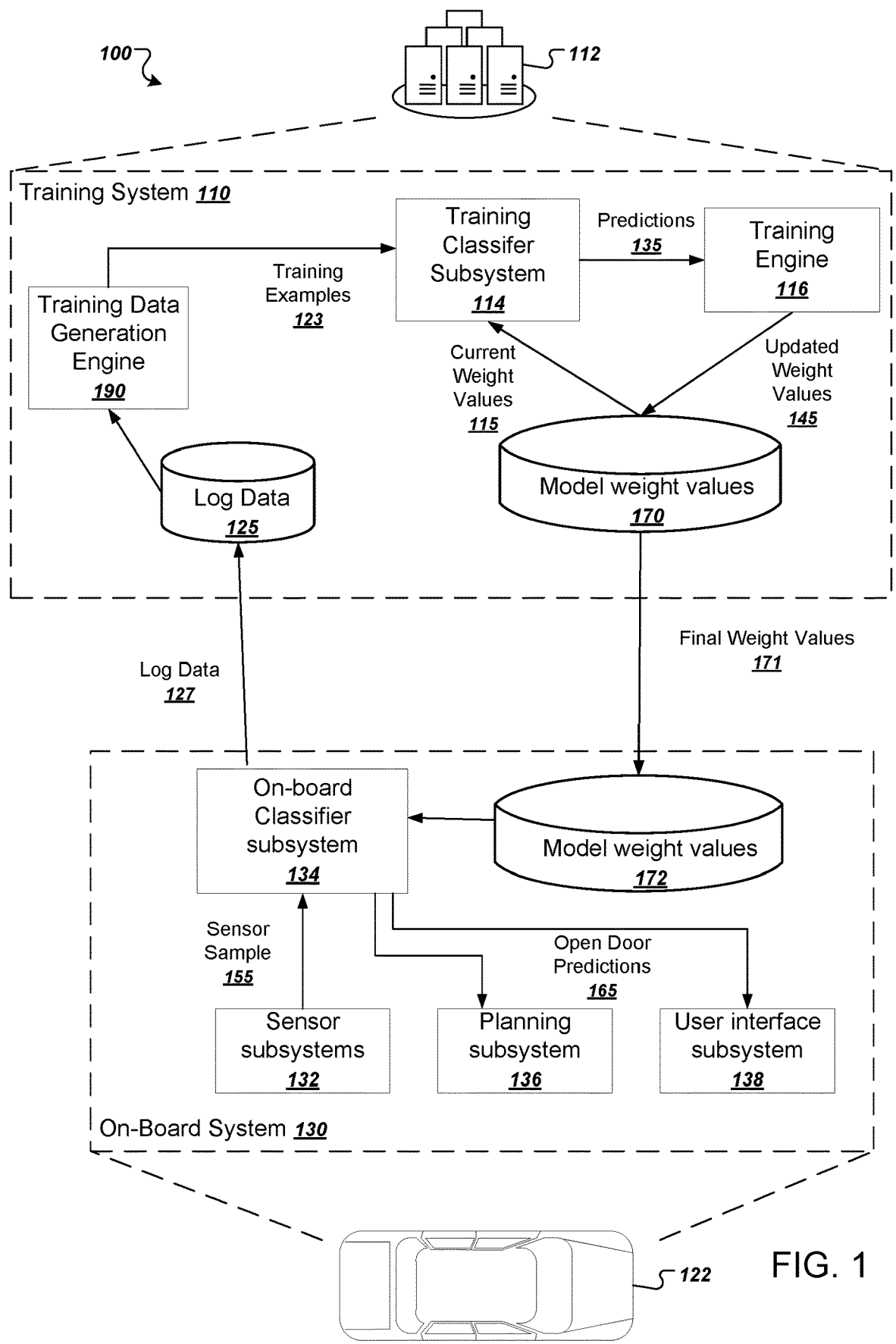
FIG. 1 is a diagram of an example system.

FIG. 1 is a diagram of an example system 100. The system 100 includes a training system 110 and an on-board system 130.

The on-board system 130 is physically located on-board a vehicle 122. The vehicle 122 in FIG. 1 is illustrated as an automobile, but the on-board system 130 can be located on-board any appropriate vehicle type. The vehicle 122 can be a fully autonomous vehicle that determines and executes fully-autonomous driving decisions in order to navigate through an environment. The vehicle 122 can also be a semi-autonomous vehicle that uses predictions to aid a human driver. For example, the vehicle 122 can autonomously apply the brakes if a prediction indicates that a human driver is about to collide with another vehicle.

The on-board system 130 includes one or more sensor subsystems 132. The sensor subsystems 132 include a combination of components that receive reflections of electromagnetic radiation, e.g., lidar systems that detect reflections of laser light, radar systems that detect reflections of radio waves, and camera systems that detect reflections of visible light.

The sensor data generated by a given sensor generally indicates a distance, a direction, and an intensity of reflected radiation. For example, a sensor can transmit one or more pulses of electromagnetic radiation in a particular direction and can measure the intensity of any reflections as well as the time that the reflection was received. A distance can be computed by determining how long it took between a pulse and its corresponding reflection. The sensor can continually sweep a particular space in angle, azimuth, or both. Sweeping in azimuth, for example, can allow a sensor to detect multiple objects along the same line of sight.

The sensor subsystems 132 or other components of the vehicle 122 can also classify groups of one or more raw sensor measurements from one or more sensors as being measures of another vehicle. A group of sensor measurements can be represented in any of a variety of ways, depending on the kinds of sensor measurements that are being captured. Each group of raw laser sensor measurements, for example, can be represented as a three-dimensional point cloud, with each point having an intensity and a position. In some implementations, the position is represented as a range and elevation pair. Each group of camera sensor measurements can be represented as an image patch, e.g., an RGB image patch.

Once a group of one or more raw sensor measurements has been classified as being a measure of another vehicle, the sensor subsystems 132 or the other components of the vehicle 122 generate a sensor sample 155 from the sensor measurements that measure the vehicle. In some cases, the sensor sample 155 is a three-dimensional tensor that represents measurements from one or more of the sensors and that each characterize the same vehicle at the same time. For example, the three-dimensional tensor can include a patch of an image captured by the camera sensor of the region of the environment where the other vehicle is located at a given time, portions of one or more projections, e.g., a projection from a top-down perspective, of sensor data captured by one or more of the laser sensors that correspond to the region of the environment where the other vehicle is located at the given time, or both.

The sensor subsystems 132 or the other components provide the sensor sample 155 to an on-board classifier subsystem 134. The on-board classifier subsystem 134 uses the sensor sample 155 to generate an open door prediction 165. As described above, each open door prediction is a prediction of whether a door of a vehicle characterized by the sensor data 155 is open. Thus, each prediction is a score, e.g., a probability, that represents the predicted likelihood that a door of the vehicle characterized by the input sensor sample is open.

The on-board classifier subsystem 134 implements the operations of an open door classifier, i.e., a machine learning model, trained to make the open door predictions 165.

In some cases, the open door classifier is a convolutional neural network that receives the sensor sample 155, i.e., a three-dimensional tensor generated from the sensor data, and processes the sensor sample 155 through multiple layers that include one or more convolutional layers to generate an open door prediction. Thus, the on-board classifier subsystem 134 includes one or more computing devices having software or hardware modules that implement the respective operations of each layer of the neural network according to an architecture of the neural network.

In some other cases, the open door classifier is a different type of machine learning model that operates on lower-dimensional features derived from the sensor sample 155. For example, the open door classifier can be a random forest model or a support vector machine model that receives as input lower-dimensional features generated from a sensor sample and generates an open door prediction from the lower-dimensional features. Thus, the on-board classifier subsystem 134 includes one or more computing devices having software or hardware modules that implement the operations necessary to generate the lower-dimensional features and to perform the operations of the model.

The on-board classifier subsystem 134 can implement the operations of the open door classifier by loading a collection of model weight values 172 that are received from the training system 110 after the open door classifier has been trained by the training system 110 to determine the model weight values 172. Although illustrated as being logically separated, the model weight values 170 and the software or hardware modules performing the operations may actually be located on the same computing device or, in the case of an executing software module, stored within the same memory device.

The on-board classifier subsystem 134 can use hardware acceleration or other special-purpose computing devices to implement some or all of the operations of the open door classifier. For example, some operations of some layers of a neural network may be performed by highly parallelized hardware, e.g., by a graphics processing unit or of another kind of specialized computing device. In other words, not all operations of each layer need to be performed by central processing units (CPUs) of the on-board classifier subsystem 134.

The on-board classifier subsystem 134 can provide the open door predictions 165 to a planning subsystem 136, a user interface subsystem 138, or both.

When a planning subsystem 136 receives the open door predictions 165, the planning subsystem 136 can use the one or more open door predictions 165 to make fully-autonomous or semi-autonomous driving decisions. For example, if the open door predictions indicate that a door of another vehicle is likely open, the planning subsystem 136 can generate a fully-autonomous plan to apply the brakes of the vehicle 122 or otherwise reduce the moving speed of the vehicle 122 in case a person is entering or leaving through the open door of the other vehicle. As another example, the planning subsystem 136 can use the open door prediction to predict the likely future trajectory of the object and use the likely future trajectory in planning the trajectory of the vehicle 122. As another example, the planning subsystem 136 can generate a semi-autonomous recommendation for a human driver to apply the brakes when a door of the other vehicle is open.

A user interface subsystem 138 can receive the open door predictions 165 and can generate a user interface presentation that identifies the other vehicle and alerts an operator of the vehicle 122 that the door of the other vehicle is open and that people may be entering or leaving. For example, the user interface subsystem 138 can generate a user interface presentation having image or video data containing a representation of the region of space that is occupied by the other vehicle and identifying the door of the vehicle as open. An on-board display device can then display the user interface presentation for view by passengers of the vehicle 122.

The on-board classifier subsystem 134 can also use the sensor data 155 to generate log data 127 that is used by the training system 110 to train the open door classifier. The on-board system 130 can provide the log data 127 to the training system 110 in offline batches or in an online fashion, e.g., continually whenever it is generated.

The log data 127 includes sensor data samples that were generated during operation of the vehicle 122 that have been classified as characterizing other vehicles in the vicinity of the vehicle 122.

The training system 110 is typically hosted within a data center 112, which can be a distributed computing system having hundreds or thousands of computers in one or more locations.

When the training system 110 receives log data 127 from a vehicle, the training system 100 stores the log data 127 in a log data repository 125. Generally, the log data repository 125 stores log data received from a large number of vehicles, i.e., the log data repository 125 stores sensor samples generated from sensor data captured during the operation of a large number of different vehicles. In some cases, the log data repository 125 can also include log data generated in simulation, i.e., generated as simulated versions of vehicles navigate through a software simulation of a real-world environment.

The training system 110 includes a training classifier subsystem 114 that can implement the operations of a classifier that is configured to make open door predictions. For example, when the classifier is a neural network, the training classifier subsystem 114 includes a plurality of computing devices having software or hardware modules that implement the respective operations of each layer of the neural network according to an architecture of the neural network.

The training open door classifier generally has the same architecture and weights as the on-board open door classifier. However, the training system 110 need not use the same hardware to compute the operations of the classifier as is used by the on-board system 134. In other words, the training system 110 can use CPUs only, highly parallelized hardware, or some combination of these.

The training system 100 uses the sensor samples stored in the log data repository 125 to generate training data that includes training examples 123 for training the open door classifier. Each training example 123 includes (i) a sensor sample characterizing a vehicle that and (ii) a label that indicates whether the car door of the vehicle is open in the sensor sample, i.e., a label that identifies a ground truth output that should be generated by the open door classifier for the sensor sample. Generating training data is described below with reference to FIGS. 2 and 3.

At any given time during the training, the training neural network subsystem 114 can compute the operations of the open door classifier using current model weight values 115 stored in a collection of model weight values 170. Although illustrated as being logically separated, the model weight values 170 and the software or hardware modules performing the operations may actually be located on the same computing device or on the same memory device.

The training classifier subsystem 114 can receive training examples 123 as input. The training neural network subsystem 114 can generate, for each training example 123, an open door prediction 135. A training engine 116 analyzes the open door predictions 135 and compares the open door predictions to the labels for the training examples 123. The training engine 116 then generates updated model weight values 145 by using an appropriate updating technique, e.g., stochastic gradient descent with backpropagation. The training engine 116 can then update the collection of model parameter values 170 using the updated model weight values 145.

After training is complete, the training system 110 can provide a final set of model weight values 171 to the on-board system 130 for use in making open door predictions 165 for fully autonomous or semi-autonomous driving decisions. The training system 110 can provide the final set of model weight values 171 by a wired or wireless connection to the on-board system 130.

Figure 2:
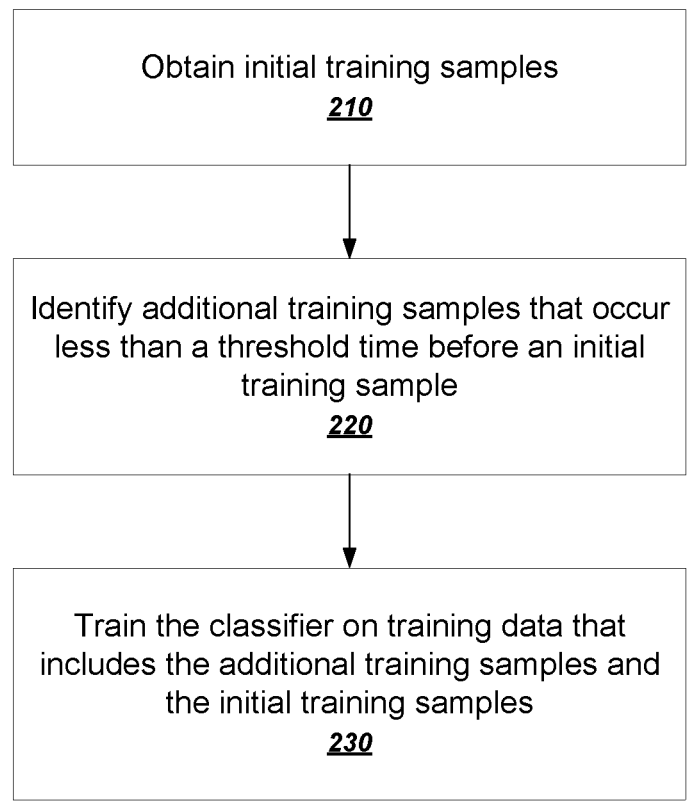
FIG. 2 is a flow chart of an example process for training an open door classifier.

FIG. 2 is a flow chart of an example process 200 for training an open door classifier. The process will be described as being performed by an appropriately programmed neural network system. For convenience, the process 200 will be described as being performed by a system of one or more computers located in one or more locations. For example, a training system, e.g., the training system 110 of FIG. 1, appropriately programmed in accordance with this specification, can perform the process 200.

The system obtains initial positive training samples (210).

In this specification, a positive training sample is a sensor sample that characterizes a vehicle and that has been associated with a label that indicates that the vehicle characterized by the sensor sample has an open door.

In some cases, the system receives data from an external system identifying certain sensor samples in the log data repository as initial positive training samples. In other cases, the system identifies certain sensor samples in the log data repository as positive training samples. An example technique for identifying initial positive training samples from the sensor samples in the log data repository is described below with reference to FIG. 3.

The system identifies additional positive training samples from the sensor samples in the log data repository (220).

More specifically, the system identifies additional positive training samples that each (i) correspond to a respective one of the initial positive training samples, (ii) characterize the same vehicle as the corresponding initial positive training sample, and (iii) were captured less than a threshold amount of time before the corresponding initial training sample.

In particular, for some or all of the vehicles characterized by initial training samples, the log data will include other sensor samples that characterize the same vehicle but that were captured at different times from the corresponding initial training sample. As an example, if the sensors of a given vehicle capture data at a rate of one sample per ten milliseconds, each other vehicle that is in the vicinity of the given vehicle for more than twenty milliseconds will be characterized by multiple samples.

In some implementations, for each of the initial positive training samples, the system identifies as a positive training sample any sample in the log data that has been classified as characterizing the same vehicle as the initial positive training samples and that was captured less than the threshold amount of time before the corresponding initial training sample. The threshold amount of time can be, e.g., half a second, one second, one and a half seconds, or two seconds.

The system designates each additional identified training sample as a positive training sample, i.e., associates each additional identified training sample with a label that indicates that the identified training sample characterizes a vehicle that has an open door.

Because car doors tends to remain open for some period of time and because vehicles tend to be stationary while the doors of the vehicle are open, the additional positive training samples will generally include samples characterizing vehicles that are farther away from the vehicle that generated the samples than the initial training samples. However, because the identified training samples are generated automatically based on their proximity in time to initial training samples, the additional samples may be noisy, i.e., may include samples that have incorrectly been classified as positive samples.

The system trains the open door classifier on training data that includes the initial training samples and the additional training samples (230). The training data also includes negative training samples, i.e., training samples that are associated with a label that indicates that the identified training sample characterizes a vehicle that does not have any open doors. The system can generate the negative training samples by randomly selecting sensor samples from the repository. That is, because such a small portion of vehicles have open doors, randomly selecting sensor samples from the repository is very likely to generate highly accurate negative samples.

In particular, the system can train the open door classifier to adjust the weights of the classifier by minimizing a loss function, e.g., a cross-entropy loss function or a log likelihood loss function, that measures the error between the predictions generated by the open door classifier and the ground truth predictions for the corresponding training samples. For example, when the classifier is a neural network, the system trains the classifier to minimize the loss using gradient descent with backpropagation.

In some cases, as will be described below with reference to FIG. 3, the system can improve the performance of the classifier by further training the classifier on additional training data.

Figure 3:
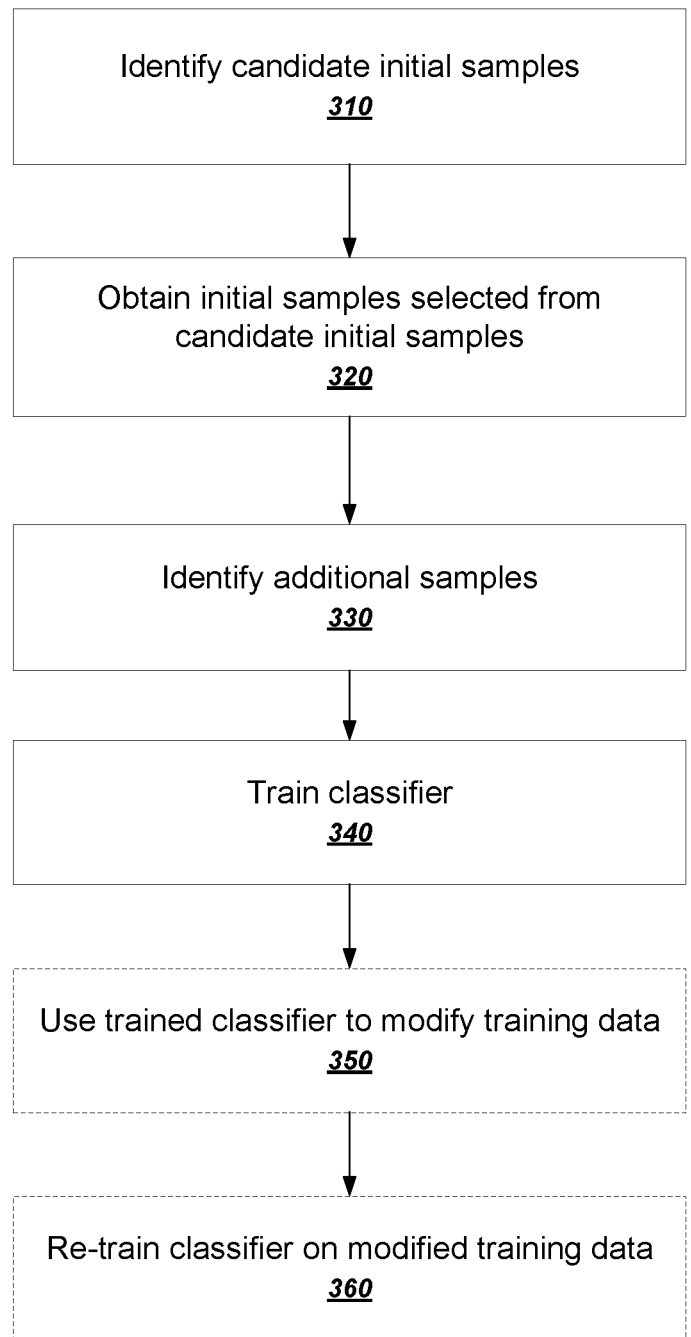
FIG. 3 is a flow chart of another example process for training an open door classifier.
Like reference numbers and designations in the various drawings indicate like elements.

FIG. 3 is a flow chart of another example process 300 for training an open door classifier. The process will be described as being performed by an appropriately programmed neural network system. For convenience, the process 300 will be described as being performed by a system of one or more computers located in one or more locations. For example, a training system, e.g., the training system 110 of FIG. 1, appropriately programmed in accordance with this specification, can perform the process 300.

The system identifies, from the sensor samples in the log data repository, candidate initial positive samples (310). A candidate initial positive sample is a sensor sample that is a candidate for being included in a positive training example.

In particular, the system can identify as a candidate initial positive sample any sensor sample in the log data repository that meets one or more criteria.

For example, the system can receive data identifying, in each sensor sample, an outline of the body of the vehicle characterized by the sensor sample, e.g., using a bounding box or other geometric shape that encompasses the body of the vehicle. The system can identify, as a candidate initial positive sample, any sensor sample that includes a significant amount of measurements outside of the outline of the body of the vehicle. For example, when the sensor samples include laser data, the laser points of the vehicle can be connected together into a rectangle model in the received data. If more than a threshold portion of the points (e.g., more than 20 points) are outside the rectangle, and the points that are outside the rectangle extend to more than a threshold distance (e.g., more than 0.5 meters) outside of the bounding box, the system identifies the sample as a positive sample.

As another example, the criteria can be satisfied when a vehicle has a small object nearby. In other words, the system can receive data identifying, for each of the sensor samples, whether the sensor sample characterizes the vehicle as well as another object that is adjacent to the vehicle and, when the sensor sample characterizes the vehicle and another object, identify the sensor sample as a positive sample.

The system obtains initial positive samples that are a subset of the candidate initial positive samples (320).

For example, the system can provide visual representations, e.g., images or videos, of each initial positive sample for presentation to human raters in a user interface that allows the human raters to submit inputs that indicate whether any of the doors of the vehicle characterized by the candidate initial positive sample are open. The system can then designate, as an initial positive sample, each candidate initial positive sample which the human rater indicated depicted an open door.

The system identifies additional positive samples using the initial positive samples (330) and trains the open door classifier on training data that includes the initial positive samples and the additional positive sample (340) as described above with reference to FIG. 2.

Optionally, once the classifier has been trained, the system further refines the model weights of the classifier by using the trained classifier to modify the training data (step 350).

In particular, the system processes some or all of the sensor samples in the log data repository using the trained classifier to generate a respective open door prediction, i.e., a respective probability, for each processed sensor sample. The system then adds each processed sensor sample that has a probability that exceeds a threshold probability, e.g., 0.7, 0.8, 0.9. or, 0.95, to the training data as a positive training sample. In some cases, the system provides visual representations, e.g., images or videos, of some or all of the samples that have probabilities that exceed the threshold for presentation to human raters in a user interface that allows the human raters to submit inputs that indicate whether any of the doors of the vehicle characterized by the candidate initial positive sample are open. The system can then designate, as a positive sample, each candidate initial positive sample which the human rater indicated depicted an open door.

In some cases, the system also removes some or all of the positive examples that were previously used to train the classifier when modifying the training data. For example, in some implementations, the system replaces all of the additional positive samples (that were identified based on temporal proximity to the initial positive samples) previously used in the training with the processed sensor samples having probabilities that exceed the threshold.

Once the system has generated the modified training data, the system re-trains the classifier on the modified training data (step 360).

In some implementations, the system uses the re-training to fine tune the model weights of classifier. In particular, in these implementations, the system trains the classifier on the modified training data to minimize the same loss function as during the initial training but starting from the values of the weights that were determined as a result of the initial training.

In some other implementations, the system re-trains the classifier from scratch on the modified training data. In particular, in these implementations, the system resets the weights to initial values and then trains the classifier on the modified training data to minimize the loss function starting from the initial values of the weights.

Thus, by performing these optional steps, the system identifies, using the trained classifier, additional positive samples in the log data repository for use in further training the trained classifier. In so doing, the system can reduce the impact of the potentially noisy additional positive samples that were added to the training data before the initial training data while still having training data that includes samples characterizing cars at a large range of distances.

Further optionally, the system can repeat steps 350 and 360 one or more times to continue to refine the classifier weights. For example, the system can repeat steps 350 and 360 until the accuracy of the trained classifier on a test set of sensor samples exceeds some threshold accuracy or can repeat steps 350 and 360 for a predetermined number of iterations.

FIGS. 1-3 describe techniques used to train a classifier to classify vehicles with open doors. However, the described techniques can be generally applied to train classifiers when objects are in other particular states. In particular, the described techniques can be used to train a classifier to generate training data for classifying an object as being in a particular state when initially quality training data is limited or not available but (1) when the object is in a particular state, a certain amount of temporal persistence is expected and other states of the object are very common but the particular state is relatively rare. Particular examples given above of other such examples include generating training data for a classifier that classifies cars as being in a parked state or a classifier that classifies school buses as being in a flashing lights state.

In other words, the system can train a classifier that is configured to receive an input sensor sample that characterizes a particular type of object and is generated from sensor data captured by one or more sensors of an autonomous vehicle and process the input sensor sample to generate a particular state score that represents a predicted likelihood that the object is in the particular state.

The system can train the classifier by obtaining a plurality of initial training examples, each initial training example comprising (i) a sensor sample from a collection of sensor samples and (ii) data classifying the sensor sample as characterizing an object that is in the particular state; generating a plurality of additional training examples, comprising, for each initial training example, identifying, from the collection of sensor samples, one or more additional sensor samples that were captured less than a threshold amount of time before the sensor sample in the initial training example was captured, and classifying each additional sensor sample as a sensor sample that characterizes an object in the particular state; and training the machine learning classifier on first training data that includes the initial training examples and the additional training examples to generate updated weights for the machine learning classifier.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A computer-implemented method of training a machine learning classifier having a plurality of weights, wherein the machine learning classifier performs operations including:
   receiving an input sensor sample that characterizes a first vehicle and is generated from sensor data captured by one or more sensors of a second vehicle, and
   processing the input sensor sample to generate an open door score that represents a predicted likelihood that the first vehicle has an open door,
   the computer-implemented method comprising:
   obtaining a plurality of initial training examples, each initial training example comprising (i) a sensor sample from a collection of sensor samples and (ii) data classifying the sensor sample as characterizing a vehicle that has an open door;
   generating a plurality of additional training examples, comprising, for each initial training example:
   identifying, from the collection of sensor samples, one or more additional sensor samples that were captured less than a threshold amount of time before the sensor sample in the initial training example was captured,
   classifying each additional sensor sample as a sensor sample that characterizes a vehicle that has an open door, and
   generating one or more of the plurality of additional training examples, wherein each of generated additional training examples comprises: (i) one of the additional sensor samples that have been identified to have been captured less than the threshold amount of time before the sensor sample in the initial training example was captured and (ii) data classifying the additional sensor sample as characterizing a vehicle that has an open door; and
   training the machine learning classifier on first training data that includes the initial training examples and the additional training examples to generate updated weights for the machine learning classifier to detect open vehicle doors.

2. The computer-implemented method of claim 1, further comprising:
   generating, using the machine learning classifier and in accordance with the updated weights, further training examples; and
   training the machine learning classifier on second training data that includes the further training examples to generate further updated weights for the machine learning classifier.

3. The computer-implemented method of claim 2, wherein training the machine learning classifier on second training data that includes the further training examples to generate further updated weights for the machine learning classifier comprises:
  training the machine learning classifier on the second training data to generate further updated weights for the machine learning classifier starting from the updated weights for the machine learning classifier.

4. The computer-implemented method of claim 2, wherein training the machine learning classifier on second training data that includes the further training examples to generate further updated weights for the machine learning classifier comprises:
  training the machine learning classifier on the second training data to generate further updated weights for the machine learning classifier starting from initial weights for the machine learning classifier.

5. The computer-implemented method of claim 2, wherein generating, using the machine learning classifier and in accordance with the updated weights, further training examples comprises:
  processing each of a plurality of candidate sensor samples from the collection of sensor samples using the machine learning classifier and in accordance with the updated weights to generate a respective open door score for each candidate sensor sample; and
  classifying each candidate sensor sample having an open door score that exceeds a threshold score as a sensor sample that characterizes a vehicle with an open door.

6. The method of claim 1, wherein identifying, from the plurality of sensor samples, one or more additional sensor samples that were captured less than a threshold amount of time before the sensor sample in the initial training example was captured comprises:
  identifying, as an additional sensor sample, each sensor sample in the plurality of samples that (i) characterizes the same vehicle as the sensor sample in the initial training example and (ii) was captured less than a threshold amount of time before the sensor sample in the initial training example was captured.

7. The computer-implemented method of claim 1, wherein obtaining a plurality of initial training examples comprises:
  identifying, from the collection of sensor samples, a plurality of candidate initial sensor samples wherein each candidate initial sensor sample includes a more than a threshold amount of measurements outside of an outline of a body of the vehicle characterized by the candidate initial sensor sample.

8. A system comprising one or more computers and one or more storage devices storing instructions that when executed by the one or more computers cause the one or more computers to perform operations for training a machine learning classifier having a plurality of weights, wherein the machine learning classifier performs operations including:
  receiving an input sensor sample that characterizes a first vehicle and is generated from sensor data captured by one or more sensors of a second vehicle, and
  processing the input sensor sample to generate an open door score that represents a predicted likelihood that the first vehicle has an open door,
  the one or more computers perform operations including:
    obtaining a plurality of initial training examples, each initial training example comprising (i) a sensor sample from a collection of sensor samples and (ii) data classifying the sensor sample as characterizing a vehicle that has an open door;
    generating a plurality of additional training examples, comprising, for each initial training example:
      identifying, from the collection of sensor samples, one or more additional sensor samples that were captured less than a threshold amount of time before the sensor sample in the initial training example was captured,
      classifying each additional sensor sample as a sensor sample that characterizes a vehicle that has an open door, and
      generating one or more of the plurality of additional training examples, wherein each of generated additional training examples comprises: (i) one of the additional sensor samples that have been identified to have been captured less than the threshold amount of time before the sensor sample in the initial training example was captured and (ii) data classifying the additional sensor sample as characterizing a vehicle that has an open door; and
    training the machine learning classifier on first training data that includes the initial training examples and the additional training examples to generate updated weights for the machine learning classifier to detect open vehicle doors.

9. The system of claim 8, the operations further comprising:
  generating, using the machine learning classifier and in accordance with the updated weights, further training examples; and
  training the machine learning classifier on second training data that includes the further training examples to generate further updated weights for the machine learning classifier.

10. The system of claim 9, wherein training the machine learning classifier on second training data that includes the further training examples to generate further updated weights for the machine learning classifier comprises:
  training the machine learning classifier on the second training data to generate further updated weights for the machine learning classifier starting from the updated weights for the machine learning classifier.

11. The system of claim 9, wherein training the machine learning classifier on second training data that includes the further training examples to generate further updated weights for the machine learning classifier comprises:
  training the machine learning classifier on the second training data to generate further updated weights for the machine learning classifier starting from initial weights for the machine learning classifier.

12. The system of claim 9, wherein generating, using the machine learning classifier and in accordance with the updated weights, further training examples comprises:
  processing each of a plurality of candidate sensor samples from the collection of sensor samples using the machine learning classifier and in accordance with the updated weights to generate a respective open door score for each candidate sensor sample; and
  classifying each candidate sensor sample having an open door score that exceeds a threshold score as a sensor sample that characterizes a vehicle with an open door.

13. The system of claim 8, wherein identifying, from the plurality of sensor samples, one or more additional sensor samples that were captured less than a threshold amount of time before the sensor sample in the initial training example was captured comprises:
  identifying, as an additional sensor sample, each sensor sample in the plurality of samples that (i) characterizes the same vehicle as the sensor sample in the initial training example and (ii) was captured less than a threshold amount of time before the sensor sample in the initial training example was captured.

14. The system of claim 8, wherein obtaining a plurality of initial training examples comprises:
   identifying, from the collection of sensor samples, a plurality of candidate initial sensor samples wherein each candidate initial sensor sample includes a more than a threshold amount of measurements outside of an outline of a body of the vehicle characterized by the candidate initial sensor sample.

15. A non-transitory computer storage medium storing instructions that when executed by one or more computers cause the one or more computers to perform operations for training a machine learning classifier having a plurality of weights, wherein the machine learning classifier performs operations including:
   receiving an input sensor sample that characterizes a first vehicle and is generated from sensor data captured by one or more sensors of a second vehicle, and
   processing the input sensor sample to generate an open door score that represents a predicted likelihood that the first vehicle has an open door,
   the one or more computers perform operations including:
      obtaining a plurality of initial training examples, each initial training example comprising (i) a sensor sample from a collection of sensor samples and (ii) data classifying the sensor sample as characterizing a vehicle that has an open door;
      generating a plurality of additional training examples, comprising, for each initial training example:
         identifying, from the collection of sensor samples, one or more additional sensor samples that were captured less than a threshold amount of time before the sensor sample in the initial training example was captured,
         classifying each additional sensor sample as a sensor sample that characterizes a vehicle that has an open door, and
         generating one or more of the plurality of additional training examples, wherein each of generated additional training examples comprises: (i) one of the additional sensor samples that have been identified to have been captured less than the threshold amount of time before the sensor sample in the initial training example was captured and (ii) data classifying the additional sensor sample as characterizing a vehicle that has an open door; and
      training the machine learning classifier on first training data that includes the initial training examples and the additional training examples to generate updated weights for the machine learning classifier to detect open vehicle doors.

16. The non-transitory computer storage medium of claim 15, the operations further comprising:
   generating, using the machine learning classifier and in accordance with the updated weights, further training examples; and
   training the machine learning classifier on second training data that includes the further training examples to generate further updated weights for the machine learning classifier.

17. The non-transitory computer storage medium of claim 16, wherein training the machine learning classifier on second training data that includes the further training examples to generate further updated weights for the machine learning classifier comprises:
   training the machine learning classifier on the second training data to generate further updated weights for the machine learning classifier starting from the updated weights for the machine learning classifier.

18. The non-transitory computer storage medium of claim 16, wherein training the machine learning classifier on second training data that includes the further training examples to generate further updated weights for the machine learning classifier comprises:
   training the machine learning classifier on the second training data to generate further updated weights for the machine learning classifier starting from initial weights for the machine learning classifier.

19. The non-transitory computer storage medium of claim 16, wherein generating, using the machine learning classifier and in accordance with the updated weights, further training examples comprises:
   processing each of a plurality of candidate sensor samples from the collection of sensor samples using the machine learning classifier and in accordance with the updated weights to generate a respective open door score for each candidate sensor sample; and
   classifying each candidate sensor sample having an open door score that exceeds a threshold score as a sensor sample that characterizes a vehicle with an open door.

20. The non-transitory computer storage medium of claim 15, wherein identifying, from the plurality of sensor samples, one or more additional sensor samples that were captured less than a threshold amount of time before the sensor sample in the initial training example was captured comprises:
   identifying, as an additional sensor sample, each sensor sample in the plurality of samples that (i) characterizes the same vehicle as the sensor sample in the initial training example and (ii) was captured less than a threshold amount of time before the sensor sample in the initial training example was captured.

* * * * *